O. SPITZER AND C. C. CONOVER.
TREATMENT OF ZINC RETORT RESIDUES.
APPLICATION FILED SEPT. 28, 1915.
1,315,349.
Patented Sept. 9, 1919.
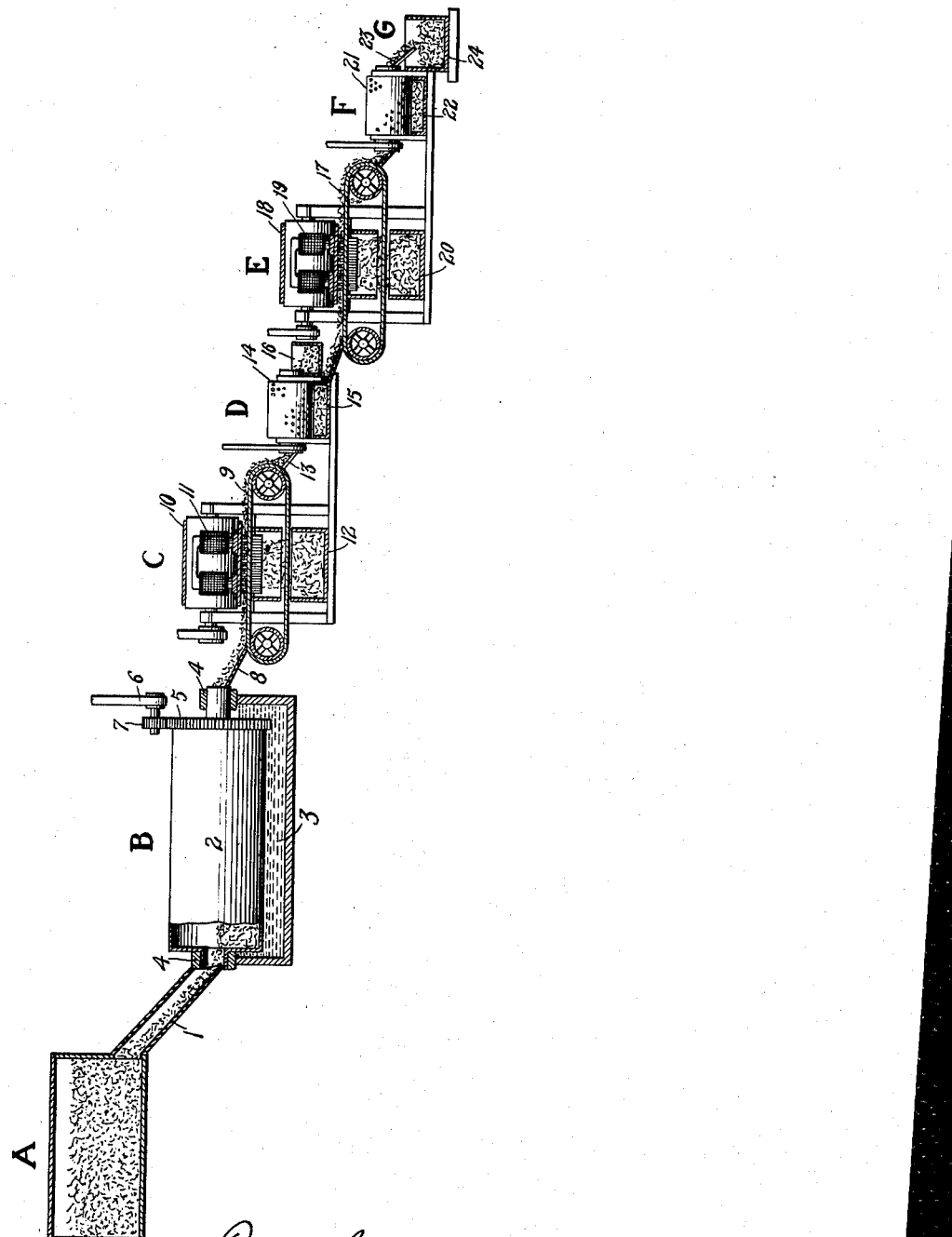

UNITED STATES PATENT OFFICE.

OSCAR SPITZER, OF NEW YORK, N. Y., AND CAIRY CLYDE CONOVER, OF SPRINGFIELD, ILLINOIS.

TREATMENT OF ZINC-RETORT RESIDUES.

1,315,349.  Specification of Letters Patent.  Patented Sept. 9, 1919.

Application filed September 28, 1915. Serial No. 53,001.

*To all whom it may concern:*

Be it known that we, OSCAR SPITZER, a subject of the Emperor of Austria, residing at 771 West End avenue, in the city, county, and State of New York, and CAIRY CLYDE CONOVER, a citizen of the United States, residing at 215 South Lewis street, city of Springfield, in the county of Sangamon and State of Illinois, have invented certain new and useful Improvements in the Treatment of Zinc-Retort Residues, of which the following is a specification.

Reference being had to the drawings filed therein, it is well known that in the process of smelting zinc ores the zinc is distilled out of the ore leaving a residue which contains, besides the unconsumed carbon, the gangue of the original ore and the metals other than zinc of the original ore, such as gold, silver, lead, copper and iron. This residue is valuable and one of the most difficult problems is to recover the metallic portion of this residue in an economical manner and as free from unconsumed carbon as possible, so that the metals will be in condition for economical shipment to the smelters which treat copper, iron, gold, silver and lead ores, which smelters are in many cases, for economic reasons, located at points far distant from the zinc smelters.

The object of our invention is to effectually and economically separate and collect the metallic residues from the unconsumed carbon so that the metallic residues are in a condition to be sent to the smelters for reduction without further special treatment, and so that the unconsumed carbon is in condition to be used again for recharging the zinc retorts.

Several methods have been tried to recover the metal left in the retorts after the zinc has been removed. The first process was to burn up the carbon so that the metals would clinker or agglomerate. This process is very wasteful, the carbon being consumed merely to get rid of it, and is also very slow, since it takes from thirty to forty days for the fire to consume all the carbon in the piles. The process of putting the residues through the well known sintering apparatus is very slow because of the large amount of unconsumed carbon in the residues. Another process used to some extent in Germany is to wash out the carbon and to treat the resultant product on a sintering apparatus. This is slow and uneconomical and can only be done where there is a large supply of water available for that purpose. This latter process is primarily for the purpose of recovering the unconsumed carbon, the recovery of metals under this process being very low. In all of the before mentioned processes it is the practice to allow the residues from the retorts to lie on the dumps to cool and to accumulate before attempting to recover the metals therefrom whereby the metals oxidize and lose their magnetic permeability. We have found that if the residues are cooled immediately after they are removed from the retort and before oxidation sets in, that almost all of the metals can be separated from the residues by passing them through an electro-magnetic separating machine, or a series of electro-magnetic separating machines of the well known type, leaving the metals in condition to be sent direct to the smelters without further special treatment and the unconsumed carbon in a condition to be used again in charging the retorts. We have found this process very economical and the recoveries thereby very high.

In some instances it has been found desirable to artificially cool the residues by putting them through a cooling apparatus such as a substantially closed drum submerged in water in order to cool them quickly so that the residues will be in a condition to be treated on the electro-magnetic machines before the metals oxidize sufficiently to lose their magnetic permeability. We have found that under some conditions it is not necessary to cool the residues artificially and that the recoveries will be very high if the separation takes place as soon as the residues cool and before the metals begin to oxidize. Since the metals oxidize very quickly when wetted with water it is desirable for the best results under our process that the residues be kept as free from unnecessary water and moisture as practical.

In some instances it has been found desirable to treat the residues in the following manner: The residues on being removed from the retort are put through a cooling apparatus consisting of a cylinder revolving partially submerged in a tank of water. The cooling cylinder is entirely closed except at each end where the feed and discharge pipes are attached. The hot gases escaping from the cooling residues prevent the ingress of air. The atmosphere inside the drum is therefore substantially a non-oxidizing atmosphere since there is little or no oxygen contained in the gases escaping from the residues. The residues having been sufficiently cooled are then subjected to magnetic separation by treating them on a magnetic separating machine of low magnetic influence for the purpose of removing that portion of the residues of greatest magnetic susceptibility. The residues having been cooled in a substantially non-oxidizing atmosphere have not become oxidized to any material extent and have therefore not lost any of their magnetic permeability. The remaining residues are then subjected to a screening process, a 12 mesh screen being used, to remove the largest pieces of unconsumed carbon. The screenings are then subjected to another magnetic separation under stronger magnetic influence at which time the metallic particles of lesser magnetic susceptibility are removed. The residues are then put through a 20-24 mesh screen where the finer coal is removed. This cycle may be continued each time using a machine with stronger magnetic influence and screen of smaller mesh until substantially all of the coal is removed. The last product will be substantially free from unconsumed carbon and may be shipped to the smelters along with the other metals recovered whenever it contains metal sufficiently valuable to warrant the expense. By this process a complete recovery of the residues is effected. The metallic portions are freed from unconsumed carbon and are in a condition ready for smelting. The coal is left in a clean condition for recharging the retorts.

We have illustrated an apparatus for carrying out our invention. A is a storage bin, which is connected with a cooling device B by means of a chute 1. The cooling device B consists of a drum 2 adapted to revolve in a tank 3. The drum is partly submerged in water and is rotated by means of gears 5 and 7. The cooling device B is connected by a chute 8 with a magnetic separator C. This separator consists of a conveyer belt 9, on which the residues are conveyed under a belt 10 which runs transversely to the conveyer belt. A magnet 11 energizes the metal plates of the transverse belt 10. The metallic particles contained in the residues are picked up by the magnetized plates on the transverse belt 10 and carried from the conveyer belt 9 to a bin 12. The residues are then conveyed by a chute 13 into a revolving screen D. This screen is about 12 mesh. It removes the larger pieces of carbon which drop into a bin 16, while the residues pass through the screen into a bin 15. These residues then pass down a chute to a magnetic separator E, which is similar to the magnetic separator C. Here further metallic values are removed and deposited in a bin 20, while the residues are carried by means of a chute to a revolving screen F, which is similar to the revolving screen D, except that the mesh is finer, being from 20 to 24 mesh. The remainder of the unconsumed carbon is deposited in a bin G, while the remainder of the zinc retort residues passes through the screens into the bin 22.

What we claim is:

A process for the treatment of zinc retort residues wherein the residues are first artificially cooled in a substantially non-oxidizing atmosphere and then subjected to magnetic separation before the metallic particles become sufficiently oxidized to lose their magnetic permeability whereby the metallic particles are separated from the unconsumed carbon.

In testimony whereof we have affixed our signatures.

OSCAR SPITZER.
CAIRY CLYDE CONOVER.